United States Patent Office 3,369,105
Patented Feb. 13, 1968

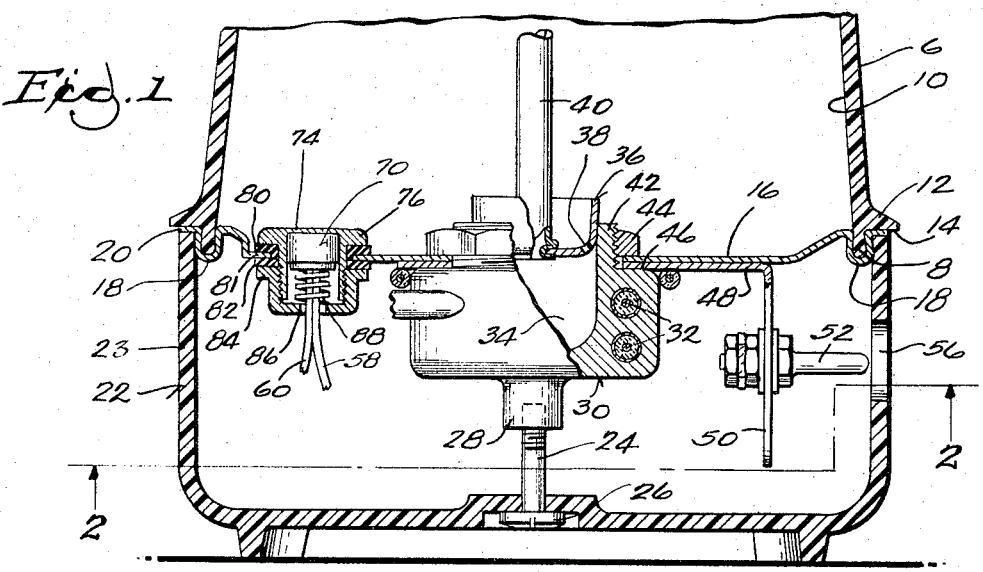
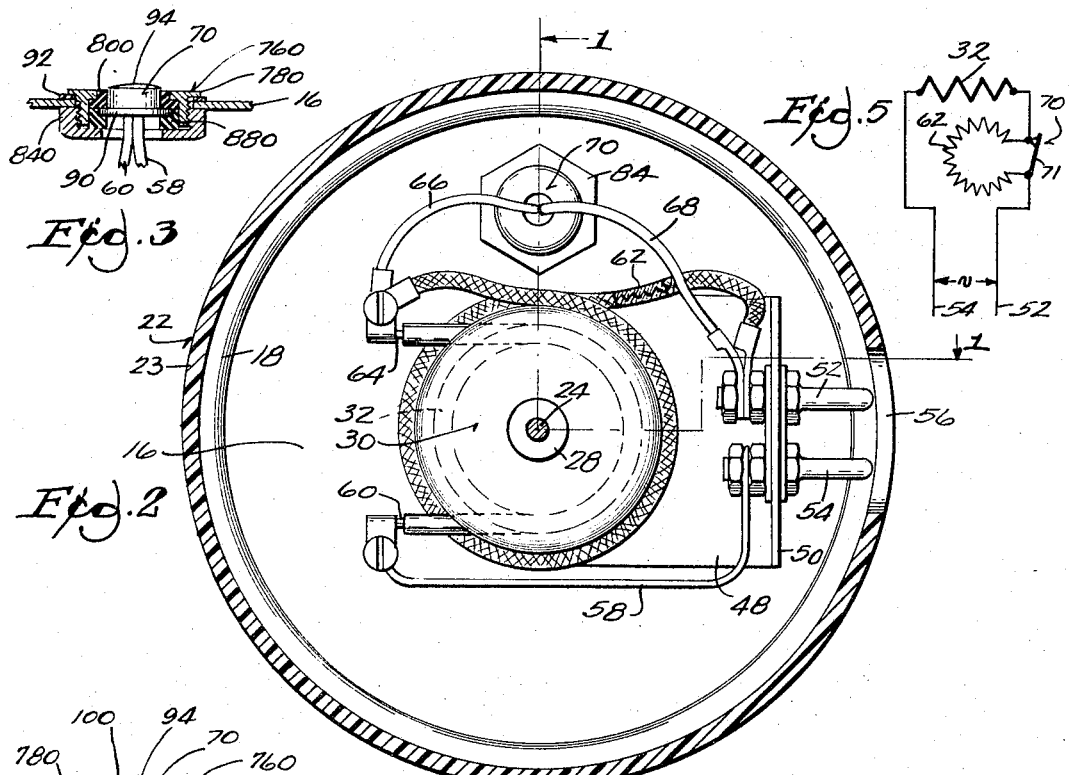

3,369,105
THERMOSTATIC SWITCH MOUNTING FOR ELECTRICAL PERCOLATORS AND THE LIKE
Sylvester L. Wheeler, Wauwatosa, Wis., assignor to Regal Ware, Inc., Kewaskum, Wis., a corporation of Wisconsin
Filed Feb. 8, 1965, Ser. No. 431,089
7 Claims. (Cl. 219—441)

ABSTRACT OF THE DISCLOSURE

A percolator bottom wall supports a cup-shaped boiler and heating element near its center and has an aperture between such element and the side wall in which is mounted a thermostatic switch with means for controlling the heating element and having insulation which protects it from direct contact with the bottom wall while exposing a thermally responsive portion to the contents of the pot. A resistor in shunt with the normally closed switch passes a limited amount of current to the heating element when the switch opens due to the rising of temperature of the pot contents.

---

This invention relates to a thermostatic switch mounting for electrical percolators and the like.

A percolator such as may be used for making beverage infusions has been selected to exemplify the invention because it is illustrative of a pot in which it is desirable that the thermostat perform the dual function of terminating percolator action and holding the attained temperature when the infusion is complete and also of protecting the pot and other property from damage in the event that the heating element is overheated.

Hence, it is an object of the present invention to expose the termostatic switch primarily to the contents of the pot, and only secondarily to heat conducted or radiated to the thermostat from the heating element. To this end, the thermostat capsule has its activating surface above the level of the pot bottom and either directly or substantially directly exposed to the pot contents, the capsule being thermally insulated to a substantial degree from heat which might otherwise be communicated to the capsule by metallic conduction or radiation from the heating element. Thus the thermostat performs its circuit-breaking function only when the temperature of the pot bottom reaches an abnormally high value.

In the drawings:

FIG. 1 is a view taken in section on the line 1—1 of FIG. 2.

FIG. 2 is a fragmentary view taken in section on the line 2—2 of FIG. 1.

FIG. 3 is a fragmentary detail sectional view of a modified mounting for the thermostat capsule in the bottom of the pot.

FIG. 4 is a view similar to FIG. 3 showing a further modified mounting.

FIG. 5 is a circuit diagram.

The pot 6 may be made of metal but may also be made of glass or synthetic resin or any other appropriate material. Its side wall 10 has, in the preferred construction illustrated, a lower margin 8 which is annular and is somewhat bulbous in vertical section. From the side wall 10 immediately above the margin 8 projects an outstanding flange at 12 which has a downwardly exposed shoulder 14.

The pot bottom 16 may conveniently be made of thin metal having a channeled portion at 18 joined to the wall by being formed around the lower margin 8. The bottom 16 may have an outstanding flange at 20. The percolator base 22 has an upstanding side wall at 23 encircling the margin 8 of the pot and the channeled portions 18 of the pot bottom. The upper margin of the base may be in abutment with the flange 20 as clearly shown in FIG. 1. A screw at 24 is headed at 26 to engage the base. The screw is detachably threaded into a boss 28 of the heater 30, the latter being connected with the pot bottom 16 and the arrangement being such that the screw 24 maintains the base and pot in assembly. The screw is readily removable to permit withdrawal of the base for access to the electrical system.

The heater 30 is illustrated as a supporting casting encircled by a heating element 32 preferably embedded therein. Assuming the pot to be a percolator, a cavity at 34 in the casting 30 may serve as a boiler into which the cup-shaped closure member 36 is fitted. An aperture 38 in member 36 permits liquid in the pot to drop into the boiler cavity 34, the resulting geyser action displacing quantities of steam and water through the geyser tube 40 in the usual way.

Surrounding cavity 34 is a threaded annular boss portion 42 of casting 30. The ring nut 44 threaded to the boss portion 42 engages the top surface of the pot bottom 16. Below the boss there is a shoulder 46 which is in thrust engagement with a bracket 48 which is held by the nut against the lower surface of the pot bottom 16. The bracket has a depending flange 50 which supports electrical terminal posts 52 and 54 where they are accessible through the opening 56 in the base to a conventional cord receptacle (not shown).

The terminal 54 is connected by conductor 58 with the extremity 60 of the heating element 32. The terminal 52 has a connection through resistor 62 to the other terminal 64 of the heating element. The resistor is normally by-passed by series-connected conductor 66, conductor 68, and the intervening normally closed thermostatic switch 70. The relatively high resistance of resistor 62 reduces current flow through the heating element 32 whenever the switch 70 opens, the net result being to eliminate substantially completely the development of heat in element 32 and to develop sufficient heat in resistor 62 so as to maintain the liquid in the pot at substantially the temperature at which the thermostatic switch opens. To this end, the resistor 62 may be wound about the outside of the heater casting 30 in which the heating element 32 is embedded.

All of the details thus far discussed are optional as to form, the present invention residing particularly in a combination which includes some of the foregoing structure with a particular assembly of the thermostat with the pot bottom.

The thermostatic switch unit 70 is illustrated as a commercially available thermostatic wafer, the interior switch portion being shown only diagrammatically at 71 and details thereof not being illustrated. The wafer being well known and in general use in commercial percolators, it suffices to note that switch 71 is normally closed and is set to open thermostatically when the top surface of the wafer reaches a predetermined temperature which it normally attains solely by conduction from the liquid contents of the pot. For example, the temperature may be that temperature at which the coffee or other liquid being brewed in the pot 6 is ready for consumption. At that point, the opening of the thermostatic switch forces any current reaching the heating element to traverse the resistor 62 whereby the current is cut to a value such that the liquid will simply be held, presumably without substantial change, at the temperature to which the thermostat responds.

If the heating element is plugged in when the pot is empty, the element will overheat. It will require a considerable degree of overheating before the thermostatic switch will be opened by heat communicated thereto by conduction from the pot bottom through the thermal insulation with which the side of the wafer is provided. However, the thermostatic switch will open before any excessive heat can be conducted through the bottom 16 from the heating element to the pot wall even if the wall is made of plastic, as shown. By limiting the current traversing heating element 32 to the amount which can be conducted through the resistor 62, injury to the pot wall is precluded.

To achieve these results the thermostatic wafer 70 should be exposed primarily to the temperature of the contents of the pot and at least materially protected from exposure independently of the liquid to the heat developed in the heater. This may be done, as in FIG. 1, by projecting the wafer through an aperture in the pot bottom to urge its heat sensing top surface against the thin top wall 74 of a housing 76 clamped to the pot bottom to close the aperture about the wafer. Housing 16 has a peripheral flange 78 engaged with a sealing grommet 80 which encircles the housing 76. A complementary sealing annulus 82 may encircle the fitting 76 in engagement with the lower surface of pot wall 16. The pot wall is thus confined between grommet 80 and the sealing ring 82 under pressure of a ring nut 84 which is in threaded engagement with fitting 76. Through the central opening 86 of the ring nut are led the conductors 58 and 60. About such opening is seated the lower end of a compression spring 88 which biases the capsule 70 upwardly against the thin top wall 74 to maintain intimate heat conducting contact through the thin top wall between the capsule 70 and the pot contents, if any.

As shown in FIGS. 3 and 4, the capsule may be exposed directly to the pot contents. FIG. 3 shows an annular fitting 760 having an opening in its bottom through which the capsule 70 projects to the limit permitted by engagement with the flanged annular gasket 800 of a flange 90 with which the capsule 70 is provided in this instance. Another annular thermally insulating seal 92 encircles the fitting 760 beneath the flange 780 thereof and in engagement with the upper surface of the pot bottom 16. The ring nut 840 is similar in function to the ring nut 84, being threaded to the fitting 760 and engaged with the undersurface of pot wall 16. An elastic annulus 880 confined between the ring nut and the capsule flange 90 is compressed when the ring nut is tightened. As compressed, it provides bias for anchoring the capsule in place with its upper surface 94 exposed to the interior of the pot. All such seals are thermally insulating.

In the construction shown in FIG. 4, the capsule is provided with a flange 90 like that shown in FIG. 3. The annular fitting 760 is also like that of FIG. 3. In this instance, a flanged annular seal is provided at 96 beneath the flange 780 of the fitting 760, such seal engaging the upper surface of the pot bottom 16 and providing substantial thermal resistance against conductivity of heat from the pot bottom to the thermostaic wafer 70. The ring nut 844 is cup shaped as in FIG. 3. When tightened on the fitting 760, it forces the packing ring 98 against the undersurface of the pot bottom. In this construction another packing ring at 100 is desirably used between the fitting 760 and the capsule flange 90. The capsule is held in place by an annular internal nut 102 through which pass the conductors 60 and 58 as in the constructions previously described.

In all of these devices, the capsule is primarily responsive substantially solely to the temperature of the liquid in the pot, if any. Thus, the principal function of the capsule in a percolator or the like is to determine when the liquid has been elevated to a temperature such that the infusion is ready for use. However, in all these devices, the capsule is also adapted to function as a sort of safety switch or thermal cutout by reducing the flow of current through the heating element whenever the heating element becomes so overheated (as may be the case if the pot is empty), as to endanger the pot, or the mechanism housed thereunder, or the furniture. In such cases, notwithstanding the thermal insulation, excessive heat generated in element 32 will be conducted or radiated from the element to reach the thermostat capsule in sufficient amount to open its normally closed switch.

I claim:
1. An infusion-making device comprising a pot having a side wall and a bottom, the bottom being provided with a first aperture and with a second aperture located between the first aperture and the side wall, a boiler having means mounting it in the first aperture of the bottom, said boiler having a cavity opening into the pot and extending within the boiler to a level well below the bottom, a heating element encircling the cavity and disposed below the bottom, and electrical supply connections to the heating element including a capsule-type thermostatic switch unit disposed in the second aperture of the bottom and having electrical connections in series with the heating element, and mounting means for said capsule-type thermostatic switch including means for insulating said switch from the bottom and from the heating element while exposing its top surface substantially directly to the temperature of the contents of said pot immediately above the level of the pot bottom.

2. In an elecrically heated pot having a side wall and having a heat conductive metallic bottom wall in which there is a first aperture and also a second aperture intermediate the first aperture and the side wall, the combination therewith of a boiler in the first aperture and having a cavity opening to the pot above the bottom wall, said boiler being equipped with a heating element having a supporting means connecting it with the bottom wall, a thermostatic switch unit in the second aperture and having a temperature sensing portion above the level of the pot bottom, means closing the second aperture about said temperature sensing portion, means for thermally insulating the temperature sensing portion from heat conduction from the pot bottom and from the heating element while leaving it exposed to the contents of the pot, and circuit connection means for subjecting the heating element to the control of said switch, said circuit connection means being disposed below the pot bottom.

3. A combination according to claim 2 in which the means for closing the second opening about said switch comprises a downwardly opening housing with a thin metallic top wall exposed to the contents of the pot and with which the temperature sensing portion of said unit is in contact.

4. A combination according to claim 2 in which said unit comprises a metallic capsule in which the thermostatic switch is enclosed and whereof its upper surface is the temperature sensing portion, the means for closing the second aperture about said capsule including parts in threaded connection with each other and respectively engaged about the second aperture with opposite surfaces of the bottom wall, said thermally insulating means comprising packing encircling the capsule and isolating it from metallic contact with the bottom wall.

5. In a pot having a non-metallic wall and a metallic bottom in marginal connection with said wall and provided with first and second apertures spaced from each other and from said wall, the first aperture being near the center of the bottom and the second aperture being disposed between the first aperture and said wall, a cup-shaped boiler disposed in the first aperture and having a cavity which opens upwardly into the pot and a heating element encircling the cavity and a threaded mounting portion projecting through said first aperture, a ring nut threaded upon the mounting portion and engaged with the upper surface of the pot bottom, the boiler having a shoulder beneath the lower surface of the pot bottom and adapted to transmit nut pressure to said bottom, bracket means provided with first and second terminals, a normally closed thermostatic switch having means for electrically connecting the first terminal with one end of the heating element, said switch having a thermally responsive portion disposed in the second aperture where it is exposed to the contents of the pot, means for closing the second aperture about said portion and including thermally insulating packing whereby the thermally responsive portion receives materially less readily heat conducted to it through the pot bottom from said heating element than it normally receives from the pot contents, a resistor in shunt with the normally closed switch and adapted to pass a limited amount of current between said first terminal and the heating element when the switch opens, and means for connecting the other end of the heating element with the second terminal.

6. A combination according to claim 5 in which the means for closing the second aperture about the switch comprises a flanged inverted cup-shaped housing member, the flange engaging the packing aforesaid above the wall, and a ring nut in threaded connection with said housing member and engaging the packing aforesaid below the wall.

7. A combination according to claim 5 in which the thermostatic unit comprises a wafer enclosing the switch and of which the upper surface constitutes the temperature sensing portion and is directly exposed to the interior of the pot, said wafer having a flange, and the means for closing the second aperture about the switch comprising packing above and below the flange and a pair of threadedly connected annular clamp members respectively having surfaces in pressure engagement about said second aperture with the upper surface and with the lower surface of the pot bottom and confining said packing upon the flange of said capsule.

References Cited

UNITED STATES PATENTS

| | | | |
|---|---|---|---|
| 1,977,821 | 10/1934 | Cornell | 219—324 X |
| 1,984,129 | 12/1934 | Green | 219—441 X |
| 2,269,448 | 1/1942 | Ferris | 219—324 X |
| 3,138,698 | 6/1964 | Wells et al. | 99—281 X |
| 3,187,161 | 6/1965 | Finn | 219—331 |
| 3,226,528 | 12/1965 | Martin | 99—281 |
| 3,261,279 | 7/1966 | Kaplan et al. | 99—282 |

RICHARD M. WOOD, *Primary Examiner.*

C. L. ALBRITTON, *Assistant Examiner.*